(12) United States Patent
Kim

(10) Patent No.: US 6,642,690 B2
(45) Date of Patent: Nov. 4, 2003

(54) METHOD FOR MEASURING PHASE CURRENT FOR INVERTER CONTROL APPARATUS USING SINGLE CURRENT SENSOR AND APPARATUS THEREFOR

(75) Inventor: Kyung-Seo Kim, Seoul (KR)

(73) Assignee: LG Industrial Systems Co., Ltd., Seoul (KR)

( * ) Notice: Subject to any disclaimer, the term of this patent is extended or adjusted under 35 U.S.C. 154(b) by 0 days.

(21) Appl. No.: 10/140,248

(22) Filed: May 8, 2002

(65) Prior Publication Data

US 2002/0167300 A1 Nov. 14, 2002

(30) Foreign Application Priority Data

May 10, 2001 (KR) .................................. 10-2001-25492

(51) Int. Cl.[7] ................ H02P 5/28; H02P 7/36
(52) U.S. Cl. .............. 318/811; 318/812; 318/808; 318/727
(58) Field of Search ................ 318/811, 599, 318/805, 808, 812, 504

(56) References Cited

U.S. PATENT DOCUMENTS 5,021,726 A * 6/1991 Reinhardt et al. .......... 318/811
5,790,396 A * 8/1998 Miyazaki et al. ............ 363/96
5,901,268 A * 5/1999 Ando et al. ................ 388/811
6,107,776 A * 8/2000 Nakazawa ................. 318/811
6,424,113 B1 * 7/2002 Kelly et al. ................ 318/599

FOREIGN PATENT DOCUMENTS

JP  06245577 A  *  9/1994  ............. H02P/5/41

* cited by examiner

Primary Examiner—P. Miller
(74) Attorney, Agent, or Firm—Birch, Stewart, Kolasch & Birch, LLP

(57) ABSTRACT

A method for measuring three-phase alternating current using a current sensor and an apparatus therefore, which are capable of not changing an average voltage for a switching period by changing reference voltages for modulating pulse width in a switching period of an inverter and compensating for the changed reference voltages in the same switching period. It is possible to prevent current from being distorted, to detect three-phase output current in all of the switching periods, and to rapidly control instantaneous current by changing the reference voltages of arbitrary two phases in one switching period of an inverter, measuring current of each phase for the switching period using the current sensor, and compensating for the amounts of changes in the changed reference voltages of the two phase in the switching period.

4 Claims, 6 Drawing Sheets

| Q1/Q4 | Q3/Q6 | Q5/Q2 | Idc |
|--------|--------|--------|-----|
| ON/OFF | ON/OFF | ON/OFF | 0 |
| ON/OFF | ON/OFF | OFF/ON | -Iw |
| ON/OFF | OFF/ON | ON/OFF | -Iv |
| ON/OFF | OFF/ON | OFF/ON | Iu |
| OFF/ON | ON/OFF | ON/OFF | -Iu |
| OFF/ON | ON/OFF | OFF/ON | Iv |
| OFF/ON | OFF/ON | ON/OFF | Iw |
| OFF/ON | OFF/ON | OFF/ON | 0 |

METHOD FOR MEASURING PHASE CURRENT FOR INVERTER CONTROL APPARATUS USING SINGLE CURRENT SENSOR AND APPARATUS THEREFOR

BACKGROUND OF THE INVENTION

1. Field of the Invention

The present invention relates to a method for measuring phase current for an inverter control apparatus and an inverter control apparatus to which the measuring method is applied, and more particularly, to a method for measuring phase current for an inverter control apparatus using a single current sensor and an apparatus therefor, which is capable of changing a reference voltage for modulating a pulse width in a cycle of a triangle wave and compensating for the reference voltage changed in the same cycle, to thus measure current every cycle of the triangle wave without measuring current with error.

2. Description of the Background Art

In general, when a three-phase alternating current motor (a three-phase induction motor) is controlled using an inverter, a current sensor is used for current control or to protect the motor and an electrical load from over-current. The three current sensors are installed to correspond to the respective phases between the inverter and the three-phase alternating current motor and measure current that flows through the three-phase alternating current motor. Also, in the case that three-phase phase current is in balance, current of two-phases is measured using two sensors and the remaining current is calculated. Accordingly, three-phase output current is obtained.

Recently, a method of measuring phase current of each switching state of the inverter by installing a single current sensor between a DC(Direct Current) output circuit and the inverter and estimating the three-phase output current of the inverter according to the phase current of each measured switching state is provided. Accordingly, it is possible to reduce expenses in the manufacturing of an apparatus for measuring three-phases alternating current.

FIG. 1 is a block diagram showing a constitution of an inverter control apparatus including an apparatus for measuring current of each phase of three-phase alternating current using a single current sensor according to a prior art.

As shown in FIG. 1, the inverter control apparatus includes a converter 11 for converting alternating current from a three-phase AC(Alternating Current) power source 10 into direct current, an inverter 14 including a pair of switching devices Q1 and Q4, a pair of switching devices Q3 and Q6, and a pair of switching devices Q5 and Q2 in the respective phases, the inverter 14 for converting direct current from the converter into alternating current and providing the alternating current to a three-phase induction motor 16, a current sensor 12 for measuring current that flows through a line between the converter 11 and the inverter 14, an analog-to digital (A/D) converter 13 for converting an analog direct current value measured by the current sensor 12 into a digital current value, an inverter controller 15 for generating a pulse width modulation (PWM) signal using a reference voltage of each phase and a triangle wave on the basis of the digital measured value from the A/D converter 13, to thus control switching of the switching devices Q1 and Q4, the switching devices Q3 and Q6, and the switching devices Q5 and Q2 in the respective phases.

The operation of the inverter control apparatus using the current sensor according to the prior art of the above constitution will now be described.

The converter 11 receives the three-phase alternating current from the three-phase current power source 10 and outputs the direct current after rectifying and smoothing to the inverter 14. The inverter 14 converts the direct current into alternating current and outputs the alternating current to the three-phase induction motor 16. The value of the direct current that flows between the converter 11 and the inverter 14 (flows through a so-called a direct current link) is measured using the current sensor 12. Thus the measured analog direct current value is converted to digital data using the A/D converter 13 and is output to the inverter controller 15. The inverter controller 15 compares the digital current value from the A/D converter 13 with a command current value, calculates a new current command value obtained by compensating for a difference value between the two values, generates a PWM signal corresponding to the new current command value, and outputs the PWM signal to the inverter 14.

The PWM signal is a rectangular wave for comparing the direct current reference voltages of the respective phases U, V, and W with the voltage signal of a triangle wave and for turning on or off the switch device of a corresponding phase. That is, the inverter controller 15 compares the triangle wave voltage signal with the reference voltage signals Vu, Vv, and Vw of the respective phases as shown in FIG. 2. When the reference voltage signals Vu, Vv, and Vw of the respective phases are larger than the triangle voltage signal, the inverter controller 15 outputs a high level of square wave signal (refer to the waveforms of Q1, Q3, and Q5 of FIG. 2) for turning on the positive switching devices Q1, Q3, and Q5 of a corresponding phase and a low level of square signal (waveforms that are obtained by inverting the waveforms of Q1, Q3, and Q5 of FIG. 2 and are not shown) for turning off the negative switching devices Q4, Q6, and Q2 of a corresponding phase. When the reference voltage signals Vu, Vv, and Vw of the respective phases are smaller than the triangle wave voltage signal, the inverter controller 15 outputs a low level of square wave signal (refer to the waveforms of Q1, Q3, and Q5 of FIG. 2) for turning off the positive switching devices Q1, Q3, and Q5 of the corresponding phase and a high level of square wave signal (waveforms that are obtained by inverting the waveforms of Q1, Q3, and Q5 of FIG. 2 and are not shown) for turning on the negative switching devices Q4, Q6, and Q2 of the corresponding phase. In the positive and negative switching devices, when the direction, in which current flows out through the inverter 14 to the three-phases induction motor 16, is considered a positive direction and the direction, in which current flows in from the three-phase induction motor 16 through the inverter 14, is considered a negative direction, in the case where the positive switching devices Q1, Q3, and Q5 are turned on, current flows out to the three-phase induction motor 16. In the case where the negative switching devices Q4, Q6, and Q2 are turned on, current flows in from the three-phase induction motor 16 through the inverter 14.

Therefore, the switching devices Q1 through Q6 of the inverter 14 are turned on when the pulse width modulated square wave signal is at a high level and are turned off when the pulse width modulated square wave signal is at a low level. Accordingly, the switching devices are at a certain state among the 24 states of FIG. 3. When the positive and negative switching devices of an arbitrary phase are simultaneously turned on, the circuit of the phase is electrically shorted. Accordingly, the inverter 14 and the motor 16 are burnt out. Therefore, it is essential for the inverter controller 15 to control the positive and negative switching devices of the respective phases to not to be simultaneously turned on.

Therefore, it is assumed that the positive and negative switching devices are not simultaneously turned on. The current Idc measured by the current sensor 12 flows through the three-phase induction motor 16 and is one among the 8 values in the right most column of FIG. 3.

The above will now be described in more detail with reference to FIGS. 1 and 3.

Referring to FIG. 3, in the states of the switching devices Q1 through Q6 in the first and the last rows, the positive switching devices Q1, Q3, and Q5 are turned on and the negative switching devices Q4, Q6, and Q2 are turned off or the positive switching devices Q1, Q3, and Q5 are turned off and the negative switching devices Q4, Q6, and Q2 are turned on. In this case, referring to FIG. 1, there is only a path, through which the current Idc flows out through the inverter 14, and there is no path, through which the current Idc flows in from the induction motor 16, or there is no path, through which the current Idc flows out through the inverter 14, and there is only the path, through which the current Idc flows in from the induction motor 16. Accordingly, a closed circuit is not formed. Therefore, the current Idc does not flow. Therefore, the current value measured by the current sensor 12 becomes zero.

Referring to FIG. 3, in the state of the switching devices Q1 through Q6 in the second row, the positive switching devices Q1, Q3, and Q5 are respectively turned on, on, and off and the negative switching devices Q4, Q6, and Q2 are respectively turned off, off, and on. In this case, referring to FIG. 1, a closed loop is formed such that the current Iu of the phase U and the current Iv of the phase V flow out to the motor 16 through the positive switching devices Q1 and Q3 and that the current Iw flows in through the negative switching device Q2 from the motor 16. Therefore, when it is considered when the amount of current that flows out to the motor 16 is the same as the amount of current that flows in from the motor 16, the amount of the current Idc is the same as the amount of the current Iw and the direction of the current Idc is inverse to the direction of the current Iw. Therefore, the current Idc is −Iw.

Referring to FIG. 3, in the states of the switching devices Q1 through Q6 in the third row, the positive switching devices Q1, Q3, and Q5 are respectively turned on, off, on and the negative switching devices Q4, Q6, and Q2 are respectively turned off, on, off. In this case, referring to FIG. 1, a closed loop is formed such that the current Iu of the phase U and the current Iw of the phase W flow out to the motor 16 through the positive switching devices Q1 and Q5 and that the current Iv flows in from the motor 16 through the negative switching device Q6. Therefore, when it is assumed that the amount of the current that flows to the motor 16 is the same as the amount of the current the flows from the motor 16, the amount of the current Idc is the same as the amount of the current Iv and the direction of the current Idc is inverse to the direction of the current Iv. Therefore, the current Idc is −Iv.

Referring to FIG. 3, in the states of the switching devices Q1 through Q6 in the fourth row, the positive switching devices Q1, Q3, and Q5 are respectively turned on, off, and off and the negative switching devices Q4, Q6, and Q2 are respectively turned off, on, and on. In this case, referring to FIG. 1, a closed loop is formed such that the current Iu of the phase U flows out to the motor 16 through the positive switching device Q1 and that the currents Iv and Iw flow in from the motor 16 through the negative switching devices Q6 and Q2. Therefore, the current Idc that flows to the motor 16 is Iu.

Referring to FIG. 3, in the states of the switching devices Q1 through Q6 in the fifth row, the positive switching devices Q1, Q3, and Q5 are respectively turned off, on, and on and the negative switching devices Q4, Q6, and Q2 are respectively turned on, off, and off. In this case, referring to FIG. 1, a closed loop is formed such that the current Iv of the phase V and the current Iw of the phase W flow out to the motor 16 through the positive switching devices Q3 and Q5 and that the current Iu flows in from the motor 16 through the negative switching device Q4. Therefore, when it is assumed that the amount of the current that flows to the motor 16 is the same as the amount of the current that flows from the motor 16, the amount of the current Idc is the same as the amount of the current Iu and the direction of the current Idc is inverse to the direction of the current Iu. Therefore, the current Idc is −Iu.

The states of the switching devices in the sixth and seventh rows and the fact that the value of the current Idc is Iv and Iw can be understood by the above description. Therefore, description thereof will be omitted.

As mentioned above, in the states of the switching devices in the first and last rows, where the positive switching devices Q1, Q3, and Q5 are simultaneously turned on or the switching devices Q4, Q6, and Q2 are simultaneously turned on, the current Idc does not flow. However, in the states of the switching devices in the remaining 6 rows, the current Idc coincides with the current of a phase among the three-phase output current of the inverter 14.

Therefore, the current sensor 12 measures the current Idc and outputs the measured value to the A/D converter 13 as an analog value. The inverter controller 15 determines the values of the currents Iu, Iv, and Iw of the respective phases on the basis of the digital current value from the A/D converter 13 and the values such as −Iw and −Iv of the current Idc in the previously stored states of the switching devices Q1 through Q6 as shown in the table of FIG. 3. Therefore, the measurement of the currents of the respective phases, which flow through the motor 16, is completed.

It is possible to correctly measure the current Idc only when the switching control signal of the switching devices A1 through Q6, that is, the PWM signal from the inverter controller 15 is maintained not to be varying for a conversion time, where the A/D converter 13 converts the analog value of the current Idc measured by the current sensor 12 into a digital value. That is, it is possible to correctly measure the current Idc only when the switching states of the switching devices Q1 through Q6 are maintained as one among the 8 states of FIG. 3 for a predetermined minimum time or more. The conversion time commonly requires a switching maintaining time of 2 through 9 microseconds or more.

However, when the minimum switching maintaining time is shorter than the time spent on converting the analog current value sensed by the current sensor 12 into a digital value by the A/D converter 13, it is not possible to correctly measure the current. For example, in FIG. 2, the positive switching devices Q1, Q3, and Q5 are respectively turned on, off, and on (the state in the third row of FIG. 3) for the time Tp. It is possible to correctly measure the current Iv of the phase V only when the time Tp is larger than the minimum conversion time Tp_min of the A/D converter.

Therefore, in order to secure the minimum switching maintaining time of the inverter 14, a time, for which the current of a phase flows, is increased by changing (distorting) an original reference voltage Vu by dV. Therefore, the current value of each phase, which flows through the motor 16, is measured by the current sensor 12 for a cycle of the triangle wave by the changed reference voltage Vu_c. However, because the reference voltage is changed (distorted) by dV in order to secure the switching time, the measured current value is erroneous. Thus distorted current waveform of a phase is an alternating current waveform distorted as shown in FIG. 4 when the current waveform is measured by a measuring instrument such as an oscilloscope.

Therefore, when an original reference voltage is changed in order to secure the minimum switching time in one cycle of the triangle wave as mentioned above, the inverter controller 15 must output the PWM signal for compensating for the current to the inverter 14 by gradually compensating for the reference voltage during various cycles of the triangle wave generated hereafter in order to correct the distorted current. However because it is not possible to secure the minimum switching time during such compensating cycles, it is not possible to measure the current value.

Therefore, according to the conventional inverter control apparatus, it is not possible to obtain a fast current control characteristic when it is necessary to instantaneous current control.

SUMMARY OF THE INVENTION

Therefore, an object of the present invention is to provide an inverter control apparatus, in which measured current is not distorted and which is capable of instantaneous controlling current in measuring current in each phase using a single current sensor and a method for measuring phase current of an inverter control apparatus.

To achieve these and other advantages and in accordance with the purposes of the present invention, as embodied and broadly described herein, there is provided an inverter control apparatus, comprising a converter for converting alternating current from a three-phase alternating current power source into direct current, an inverter provided with a pair of switching devices in each of the three phases, the inverter for converting direct current from the converter into alternating current and providing the alternating current to a three-phase induction motor, a current sensor for measuring current of each phase, which flows through the motor, an A/D converter for converting an analog measured value of current of each phase, which is measured by the current sensor, into a digital measured value, and an inverter controller for generating a reference voltage of each phase and a PWM signal using a triangle wave on the basis of the digital measured value from the analog digital converter, controlling switching of a switching device of each phase, changing the reference voltages of arbitrary two phases in one cycle of the triangle wave, and compensating for the amounts of changes in the changed reference voltages of the two phases in the one cycle of the triangle wave.

There is provided a method for measuring current of each phase for an inverter control apparatus comprising a converter for converting alternating current from a three-phase alternating current power source into direct current, an inverter comprising a pair of switching devices in each phase, the inverter for converting direct current from the converter into alternating current and providing the alternating current to a three-phase induction motor, a current sensor for measuring current of each phase, which flows through the motor, an analog-to digital (A/D) converter for converting an analog measured value of current of each phase, which is measured by the current sensor, into a digital measured value, and an inverter controller for generating a reference voltage of each phase and a pulse width modulation (PWM) signal using a triangle wave on the basis of the digital measured value from the analog digital converter, to thus control switching of a switching device of each phase, the method comprising the steps of (a) changing the reference voltages of arbitrary two phases in one cycle of the triangle wave, (b) measuring current of each phase for one cycle of the triangle wave using the current sensor, and (c) compensating for the amount of change in the reference voltages of the two phases in the one cycle of the triangle wave.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Figure 5:
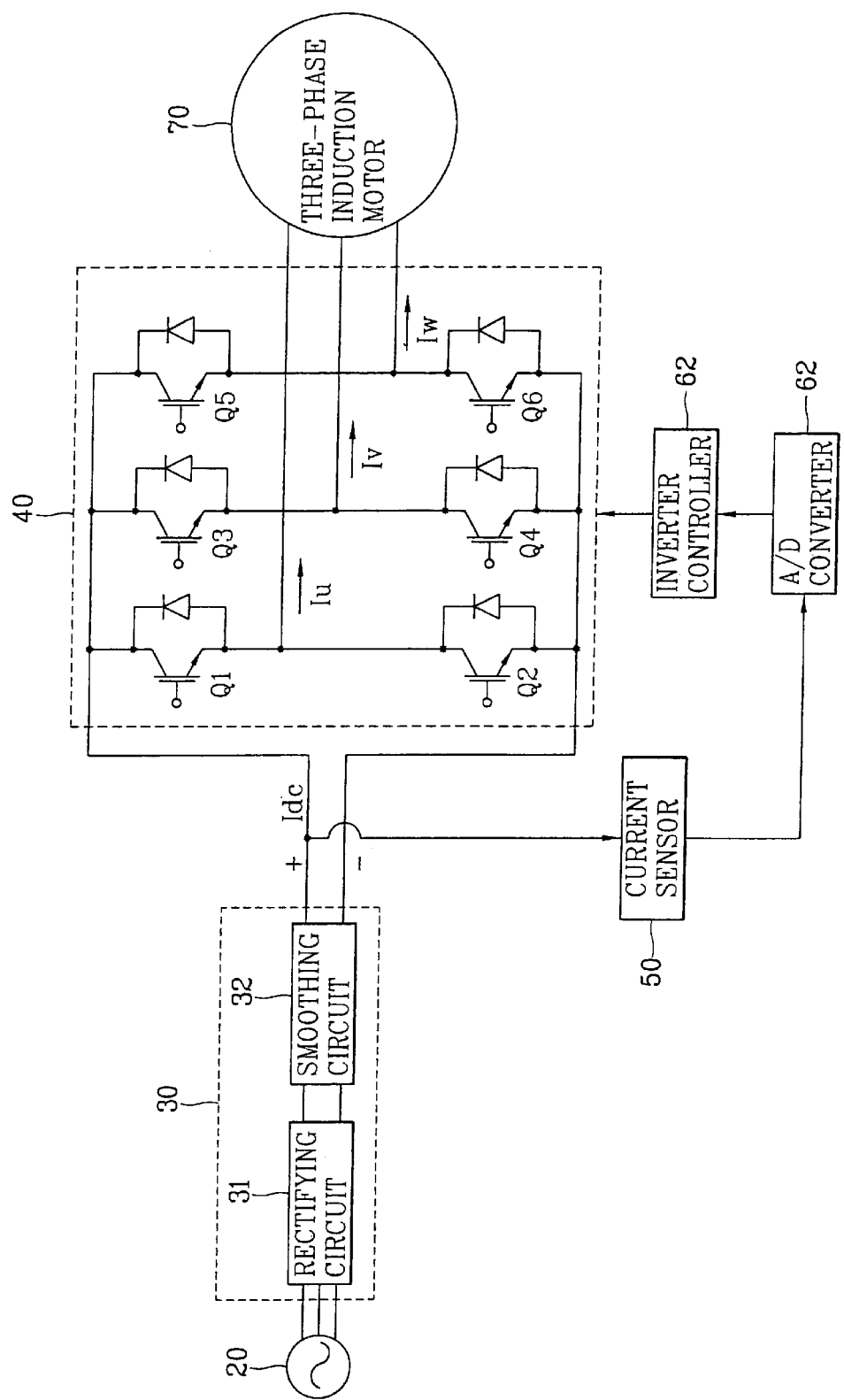
FIG. 5 is a block diagram showing a constitution of an inverter control apparatus including an apparatus for measuring alternating current of each phase using a current sensor according to the present invention.

FIG. 5 is a block diagram showing a constitution of an inverter control apparatus including an apparatus for measuring alternating current of each phase using a current sensor according to the present invention.

As shown in FIG. 5, the inverter control apparatus according to the present invention includes a converter 30 for converting alternating current from a three-phases alternating power source 20 into direct current, an inverter 40 including a pair of switching devices Q1 and Q4, a pair of switching devices Q3 and Q6, and a pair of switching devices Q5 and Q2 in the respective phases, the inverter 40 for converting direct current from the converter 30 into alternating current and providing the alternating current to a three-phase induction motor 70, a current sensor 50 for measuring current of each phase, which flows through the motor 70, an analog-to-digital (A/D) converter 62 for converting the analog measured value of current of each phase, which is measured by the current sensor 50, into a digital measured value, and an inverter controller 61 for generating a pulse width modulation (PWM) signal using a reference voltage of each phase and a triangle wave on the basis of the digital measured value from the A/D converter 62, controlling switching of the switching devices Q1 and Q4, Q3 and Q6, and Q5 and Q2 of the respective phases, changing the reference voltages of arbitrary two phases in one cycle of the triangle wave, and for compensating the amount of change of the changed reference voltages of the two phases in the one cycle.

The converter 30 includes a rectifying circuit 31 for rectifying alternating current into direct current and a smoothing circuit 32 for smoothing direct current from the rectifying circuit 31.

The operation of the inverter control apparatus including the apparatus for measuring alternating current of each phase using the current sensor according to the present invention of the above constitution will now be described.

Figure 6:
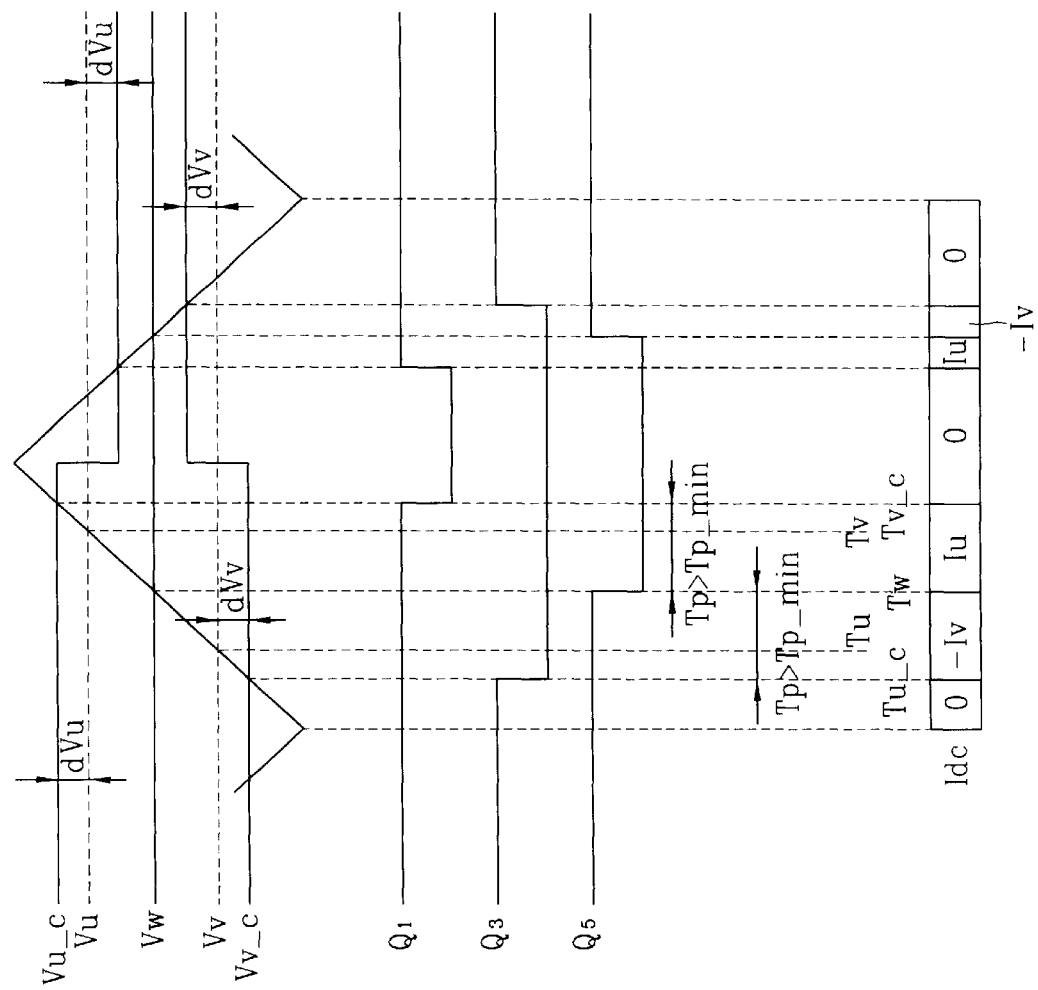
FIG. 6 shows waveforms showing the reference voltages of the phases U, V, and W, the states of switching devices, and measured current during one cycle of a triangle wave according to the present invention.

The converter 30 receives three-phase alternating current from the three-phases alternating current power source 20, rectifies the three-phase alternating current by the rectifying circuit 31, smoothes the three-phase alternating current by the smoothing circuit 32, and outputs direct current to the inverter 40. The inverter 40 converts the direct current into alternating current and outputs the alternating current to the three-phase induction motor 70. The value of the direct current that flows between the converter 30 and the inverter 40 (flows through so called a direct current link) is measured using the current sensor 50. Thus measured analog direct current value is converted into digital data using the A/D converter 62 and is output to the inverter controller 60. The inverter controller 60 compares the value of digital current from the A/D converter 62 with the value of command current, calculates a current command value obtained by compensating for a difference value between the two values, generates a PWM signal corresponding to the calculated current command value, and outputs the PWM signal to the inverter 40. In order to generate the PWM signal, the direct current reference voltages of the respective phases U, V, and W are compared with the voltage signal of a triangle wave and a rectangular wave signal for turning on or off the switching device of a corresponding phase is generated. That is, the inverter controller 60 compares the triangle wave voltage signal with the reference voltage signals Vu, Vv, and Vw of the respective phases as shown in FIG. 6. When the reference voltage signals Vu, Vv, and Vw of the respective phases are larger than the triangle voltage signal, the inverter controller 60 outputs a high level of square wave signal (refer to the waveforms of Q1, Q3, and Q5 of FIG. 6) for turning on the positive switching devices Q1, Q3, and Q5 of a corresponding phase and a low level of square signal (waveforms that are obtained by inverting the waveforms of Q1, Q3, and Q5 of FIG. 6 and are not shown) for turning off the negative switching devices Q4, Q6, and Q2 of a corresponding phase. When the reference voltage signals Vu, Vv, and Vw of the respective phases are smaller than the triangle wave voltage signal, the inverter controller 60 outputs a low level of square wave signal (refer to the waveforms of Q1, Q3, and Q5 of FIG. 6) for turning off the positive switching devices Q1, Q3, and Q5 of the corresponding phase and a high level of square wave signal (waveforms that are obtained by inverting the waveforms of Q1, Q3, and Q5 of FIG. 6 and are not shown) for turning on the negative switching devices Q4, Q6, and Q2 of the corresponding phase. When a direction, in which current flows out to the three-phase induction motor 70 through the inverter 40, is considered to be a positive direction and a direction, in which current flows in from the three-phase induction motor 70 through the inverter 40, is considered to be a negative direction, in the case where the positive switching devices Q1, Q3, and Q5 are turned on, current flows out to the three-phases induction motor 70. In the case where the negative switching devices Q4, Q6, and Q2 are turned on, current flows in from the three-phase induction motor 70 through the inverter 40. Therefore, the positive and negative switches are defined as mentioned above.

Therefore, the switching devices Q1 through Q6 of the inverter 40 are turned on when the pulse width modulated square wave signal is at a high level and are turned off when the pulse width modulated square wave signal is at a low level. Accordingly, the switching devices are at a certain state among the 24 states of FIG. 3. When the positive and negative switch devices of an arbitrary phase are simultaneously turned on, the circuit of the phase is electrically shorted. Accordingly, the inverter 40 and the motor 70 are burnt out. Therefore, it is essential for the inverter controller 60 to control the positive and negative switching devices of the respective phases not to be simultaneously turned on. Therefore, it is assumed that the positive and negative switching devices are not simultaneously turned on.

Figure 1:
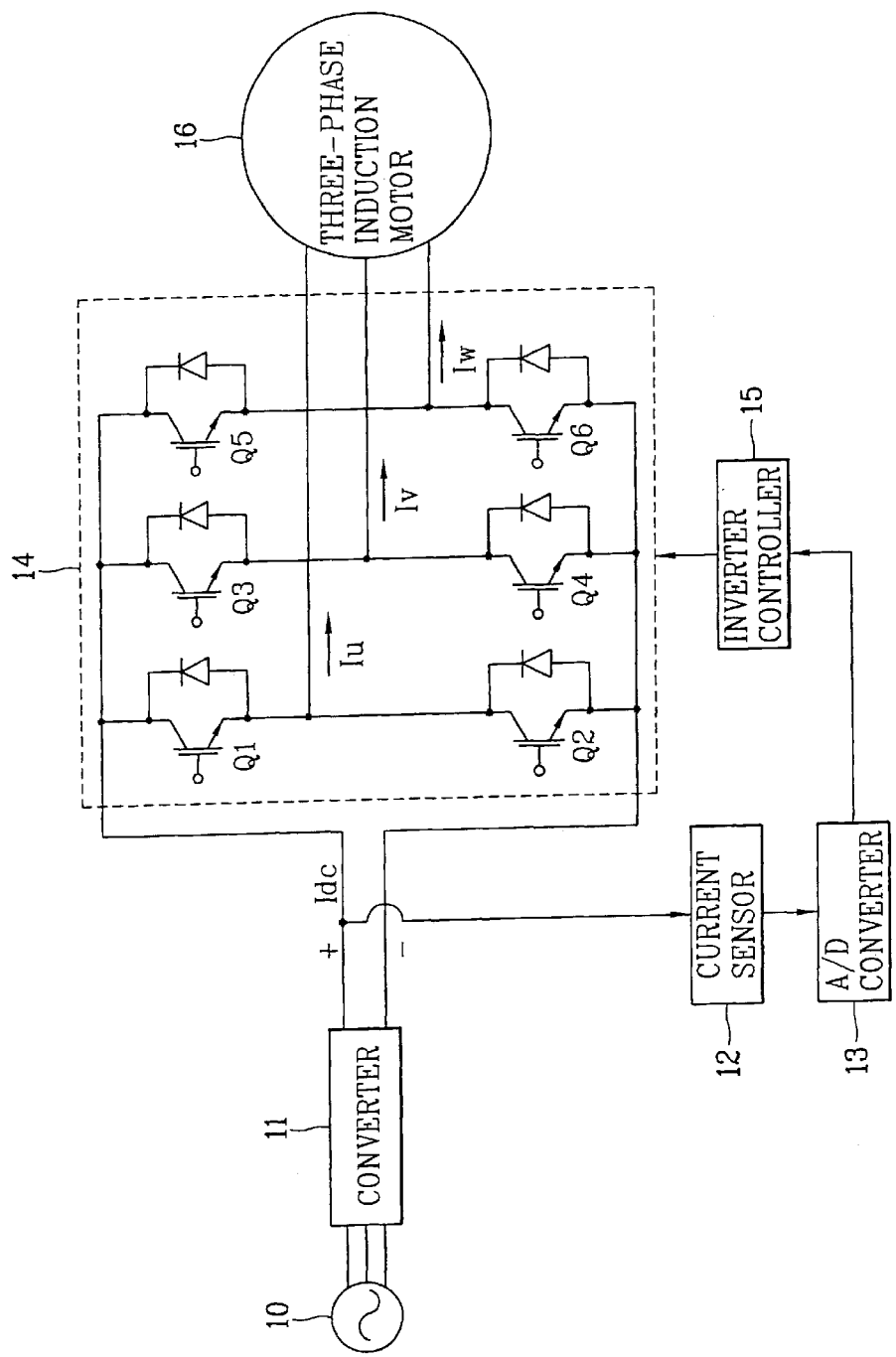
FIG. 1 is a block diagram showing a constitution of an inverter control apparatus including an apparatus for measuring alternating current of each phase using single current sensor according to a prior art.
Figure 2:
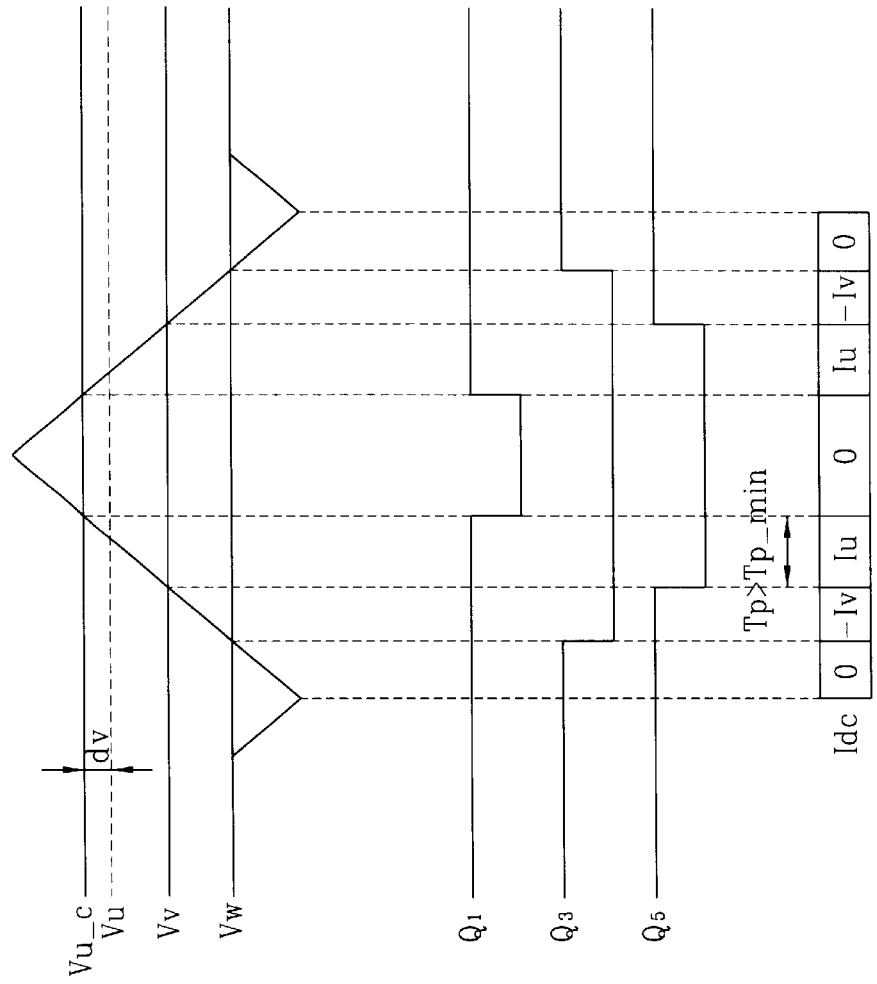
FIG. 2 shows waveforms showing the reference voltages of the phases U, V, and W, the states of switching devices, and measured current during one cycle of a triangle wave according to the prior art.
Figures 3, 4:
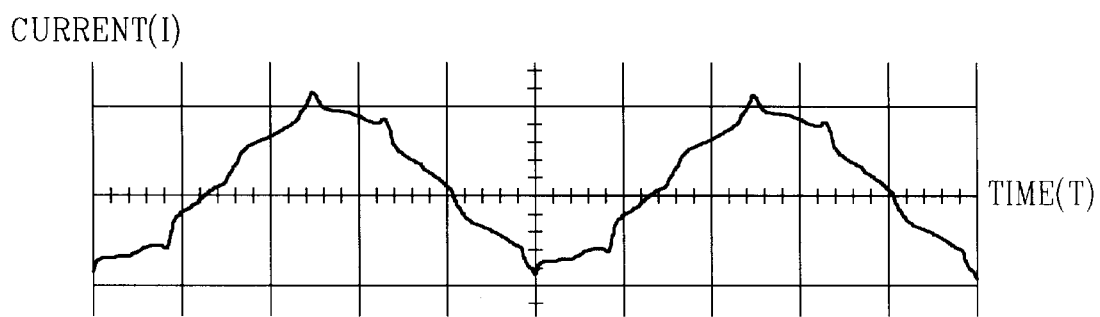
FIG. 3 is a table showing current that flows through a motor according to the switching states of switching devices according to the prior art and according to the present invention.
FIG. 4 shows a current waveform detected according to the prior art.

The current Idc measured by the current sensor 50 flows through the three-phase induction motor 70 and is one among the 8 values in the right most column of FIG. 3. According to the present invention, the table of FIG. 3 showing the on/off states of the switching devices Q1 through Q6 of each phase and the state of the current Idc according to the on/off states is the same as mentioned in description of the prior art. Therefore, detailed description of the table will be omitted.

As in a prior art, the current Idc does not flow in the case of the first and the last rows of FIG. 3, where the positive switching device Q1, Q3, and Q5 are simultaneously turned on or the negative switching devices Q4, Q6, and Q2 are simultaneously turned on. Also, as in the prior art, in the remaining 6 rows, the current Idc coincides with the current of one phase among the three-phase output currents of the inverter 40. The current sensor 50 measures the current Idc and outputs the current Idc to the A/D converter 62 as an analog value. The inverter controller 61 determines the values of the currents Iu, Iv, and Iw on the basis of the digital current value from the A/D converter 62 and the values of the current Idc such as −Iw and −Iv in the previously stored states of the switching devices Q1 through Q6 as shown in the table of FIG. 3. Therefore, the measurement of current of each phase, which flows through the motor 70, is completed.

As shown in FIG. 6, the current Iu of the phase U and the current Iv of the phase V, that is, the currents of two phases are measured. The current of the remaining one phase can be calculated by the inverter controller 61 according to the principle of a three-phase current being balancing, that is, Iu+Iv+Iw=0. Also, the reference voltage waveform is shown as a direct current waveform in FIG. 6. However, FIG. 6 shows a momentary state. The entire reference voltage waveform is a sinusoidal waveform, where a momentary straight line forms a sinusoidal wave. It is possible to measure the current Iw of the phase W in a triangle wave cycle hereafter.

According to the present invention, the inverter controller 61 controls an inverter as follow s in order to correctly measure and control instantaneous current of each phase.

Because the switching states of the switching devices as shown in FIG. 3 must be maintained (not varying) for the conversion time of the A/D converter 62 for converting the analog current value measured by the current sensor 50 into digital current value, the inverter controller 61 measures the current value of each phase under the condition that a minimum switching maintaining time is secured by changing the reference voltages of arbitrary two phases.

The inverter controller 61 compensates for the amount of change in the reference voltages of the two phases in the cycle of a triangle wave so that an average reference voltage does not change for a cycle of the triangle wave. For example, in FIG. 6, when a three-phase PWM signal for controlling the switching of the switching devices Q1 through Q6 of the inverter 40 using the triangle wave and a reference voltage wave is output, in the case where it is assumed that the reference voltage Vu of the phase U has the largest value, the reference voltage Vw of the phase W has a medium value, and the reference voltage Vv of the phase V has the smallest value, the switching point of time Tv of the phase V takes the lead in the rising period of the triangle wave. The switching point of time of the switching device of each phase is determined in the order of the switching point of time Tw of the phase W and the switching point of time Tu of the phase U. In order to secure the minimum switching maintaining time of the inverter, the switching point of time is moved such that $Vu\_c=Vu+d\_Vu$ by increasing the reference voltage of the phase U and $Vv\_c=Vv-d\_Vv$ by reducing the reference voltage of the phase V in the rising period of the triangle wave. Wherein $D\_Vu$ and $d\_Vv$ are compensation voltages. $d\_Vu=k(Tp\_min-(Tw-Tu))$ and $d\_Vv=k(Tp\_min-(Tw-Tv))$. $Tp\_min$ is the minimum time required for converting an analog measured value into a digital measured value. $Tw-Tv$ is the time from the switching point of time Tw to the switching point of time Tv. K is a ratio of the switching time to the reference voltage.

Accordingly, when $Tu\_c$ is obtained by advancing the point of time Tu viewing from the Tw and $Tv\_c$ is obtained by delaying the point of time Tv, $(Tw-Tu\_c) \geq Tp\_min$ and $(Tw-Tv\_c) \geq Tp\_min$. That is, because the time from the switching point of time Tw to the switching point of time $Tu\_c$ and the time from the switching point of time Tw to the switching point of time $Tv\_c$ are equal to or larger than the minimum time required for converting the analog measured value into the digital measured value, it is possible to correctly measure the current Iu of the phase U and the current Iv of the phase V. Also, the inverter controller 61 can calculate the current of the remaining one phase, that is, the current Iw of the phase W by using the principle of three phases being balancing.

An average voltage does not change for one cycle of the triangle wave by compensating for the amount of change in the reference voltages in a period, where the triangle wave is reduced. That is, when the reference voltages in the period, where the triangle wave is reduced, are $Vu\_c=Vu-d\_Vu$ and $Vv\_c=Vv+d\_Vv$, the average voltages for one cycle of the triangle wave are Vu and Vv, which are the same as original reference voltages. Therefore, because the current is not distorted, it is not necessary to compensate for the reference voltage for compensating for the distortion of the current.

Figure 7:
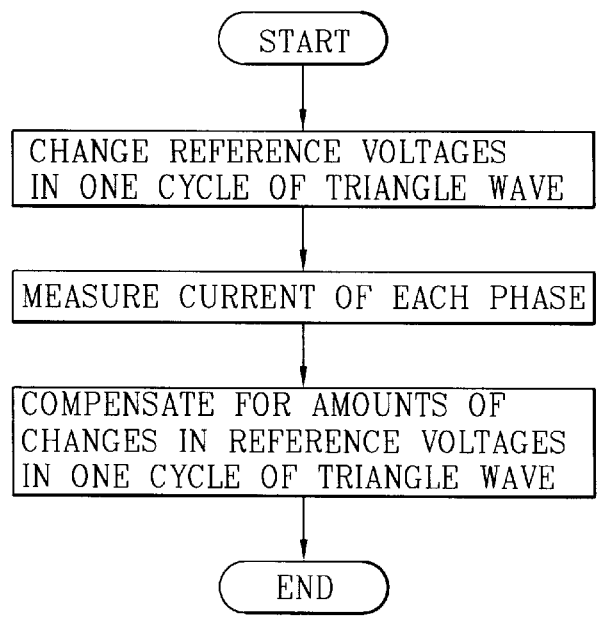
FIG. 7 is a flowchart showing a method for measuring three-phase alternating current in each phase using single current sensor according to the present invention.

FIG. 7 is a flowchart showing a method for measuring three-phase alternating current using a current sensor according to the present invention.

As shown in FIG. 7, a method for measuring current of each phase for an inverter control apparatus performs steps of changing reference voltages in one cycle of a triangle wave, measuring current of each current, and compensating for the amounts of changes in the changed reference voltages in the one cycle of the triangle wave.

In the step of changing the reference voltages, in each cycle of a triangle wave, the reference voltage of the phase having the highest reference voltage among the three-phase reference voltages of a rising period of the triangle wave is increased by a predetermined voltage and the reference voltage of the phase having the lowest reference voltage is decreased by the predetermined voltage.

Also, in the step of compensating for the reference voltages, in each cycle of the triangle wave, the reference voltage of the phase having the highest reference voltage among the three-phase reference voltages in a falling period of the triangle wave is decreased by the predetermined voltage and the reference voltage of the phase having the lowest reference voltage is increased by the predetermined voltage. Therefore, an average reference voltage during one cycle of the triangle wave does not change. Also, the predetermined voltage is smaller than a potential difference between the respective phases of the three-phase reference voltages.

Figure 8:
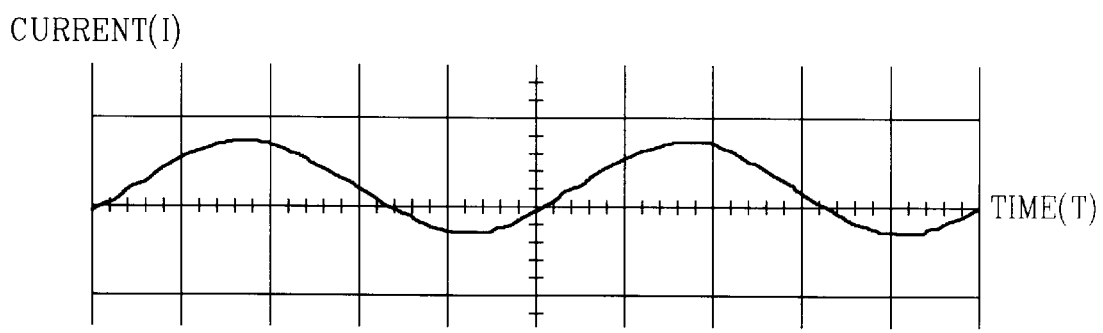
FIG. 8 shows the waveform of current detected by the apparatus and the method according to the present invention.

FIG. 8 shows the waveform of the detected current according to the present invention. The current waveform shown in FIG. 8 is a sinusoidal wave without distortion.

As mentioned above, in order to secure the switching maintaining time for detecting the three-phases output current, the reference voltages are changed in one cycle of the triangle wave and the reference voltages are compensated for in the same cycle. Accordingly, it is possible to prevent the distortion of current, to measure three-phases current in each cycle of the triangle wave, and to current control instantaneously.

What is claimed is:

1. A method for measuring current of each phase for an inverter control apparatus comprising a converter for converting alternating current from a three-phase alternating current power source into direct current, an inverter provided with a pair of switching devices in each phase, the inverter for converting direct current from the converter into alternating current and providing the alternating current to a three-phase induction motor, single current sensor for measuring current of a phase, which flows through the motor, an analog-to digital (A/D) converter for converting an analog measured value of current, which is measured by the current sensor, into a digital measured value, and an inverter controller for generating a reference voltage of each phase and a pulse width modulation (PWM) signal using a triangle wave on the basis of the digital measured value from the analog digital converter, to thus control switching of the switching device of each phase, the method comprising the steps of:

(a) changing the reference voltages of arbitrary two phases in one cycle of the triangle wave;

(b) measuring current of each phase for the one cycle of the triangle wave using the current sensor; and (c) compensating for the amount of change in the reference voltages of the two phases in the one cycle of the triangle wave.

2. The method of claim 1, wherein, in the step (a), the reference voltage of one phase having the highest voltage among three-phase reference voltages in a rising period of the triangle wave is increased by a predetermined voltage and the reference voltage of the other phase having the lowest voltage is decreased by the predetermined voltage for the one cycle of the triangle wave, and wherein, in the step (c), the reference voltage of one phase having the highest voltage among the three-phase reference voltages in a falling period of the triangle wave is decreased by the increased voltage and the reference voltage of the other phase having the lowest voltage is reduced for the one cycle of the triangle wave so that an average reference voltage of each phase does not change for the one cycle of the triangle wave.

3. An inverter control apparatus, comprising:

a converter for converting alternating current from a three-phase alternating current power source into direct current;

an inverter provided with a pair of switching devices in each of the three phases, the inverter for converting direct current from the converter into alternating current and providing the alternating current to a three-phase induction motor;

a current sensor for measuring current of a phase, which flows through the motor;

an A/D converter for converting an analog measured value of current of the phase, which is measured by the current sensor, into a digital measured value; and an inverter controller for generating a reference voltage of each phase and a Pulse Width Modulation signal using a triangle wave on the basis of the digital measured value from the analog digital converter, controlling switching of a switching device of each phase, changing the reference voltages of arbitrary two phases in one cycle of the triangle wave, and compensating for the amounts of changes in the changed reference voltages of the two phases in the one cycle of the triangle wave.

4. The inverter control apparatus of claim 3, wherein the inverter controller controls the switching of the switching device of each phase by generating the Pulse Width Modulation signal using the reference voltage of each phase and the triangle wave, increases the reference voltage of one phase having the highest voltage among three-phases reference voltages in a rising period of one cycle of the triangle wave by a predetermined voltage, decreases the reference voltage of the phase having the lowest voltage among the three-phase reference voltages by the predetermined voltage, decreases the reference voltages by the amount of increase in the reference voltage of one phase having the highest voltage in a falling period of the one cycle of the triangle wave, and increases the reference voltages by the amount of decrease in the reference voltage of the phase having the lowest voltage, so that an average reference voltage of each phase does not change for one switching period.

* * * * *